United States Patent
Malloy et al.

(10) Patent No.: US 10,832,280 B2
(45) Date of Patent: Nov. 10, 2020

(54) FRAUDULENT TRAFFIC DETECTION AND ESTIMATION

(71) Applicant: comScore, Inc., Reston, VA (US)

(72) Inventors: Matthew L. Malloy, Reston, VA (US); Scott Alfeld, Reston, VA (US); Paul Barford, Reston, VA (US)

(73) Assignee: Comscore, Inc., Reston, VA (US)

( * ) Notice: Subject to any disclaimer, the term of this patent is extended or adjusted under 35 U.S.C. 154(b) by 772 days.

(21) Appl. No.: 15/163,679

(22) Filed: May 25, 2016

(65) Prior Publication Data

US 2016/0364750 A1  Dec. 15, 2016

Related U.S. Application Data

(60) Provisional application No. 62/175,064, filed on Jun. 12, 2015.

(51) Int. Cl.
   *G06Q 30/02* (2012.01)
   *H04L 29/06* (2006.01)

(52) U.S. Cl.
   CPC ..... *G06Q 30/0248* (2013.01); *G06Q 30/0277* (2013.01); *H04L 63/1425* (2013.01); *H04L 63/1441* (2013.01)

(58) Field of Classification Search
   CPC ........... G06Q 20/4016; G06Q 30/0248; G06Q 30/0277; G06Q 30/0207–0277; H04L 63/1425; H04L 63/1441
   See application file for complete search history.

(56) References Cited

U.S. PATENT DOCUMENTS

| | | | |
|---|---|---|---|
| 9,027,127 B1* | 5/2015 | Soldo | H04L 63/1425 726/22 |
| 2010/0054278 A1* | 3/2010 | Stolfo | H04L 63/1425 370/474 |
| 2014/0153396 A1* | 6/2014 | Gopalan | H04L 41/142 370/235 |
| 2015/0101053 A1* | 4/2015 | Sipple | H04L 63/1425 726/24 |

* cited by examiner

*Primary Examiner* — Chinyere Mpamugo
(74) *Attorney, Agent, or Firm* — BakerHostetler

(57) ABSTRACT

Methods and systems for fraudulent traffic detection and estimation are disclosed. Initially, an empirical distribution of a plurality of features based on a first plurality of datapoints for the plurality of features is received. Next, a model distribution of the plurality of features based on a second plurality of datapoints for the plurality of features is received. Then, it is determined, a minimum number of datapoints to remove from the first plurality of datapoints to create a modified empirical distribution corresponding to the model distribution within a first significance level. Finally, an alert that the first plurality of web traffic includes at least one fraudulent instance of web traffic is generated in response to the determination that the minimum number of datapoints is greater than a first threshold.

20 Claims, 5 Drawing Sheets

FRAUDULENT TRAFFIC DETECTION AND ESTIMATION

CROSS-REFERENCE TO RELATED APPLICATION

This application claims the benefit of U.S. Provisional Application No. 62/175,064, filed on Jun. 12, 2015, the disclosure of which is hereby incorporated by reference in its entirety.

FIELD OF THE INVENTION

This disclosure generally relates to fraudulent traffic detection and estimation, and more particularly relates to fraudulent traffic detection and estimation using comparisons between a received empirical distribution and a received model distribution.

BACKGROUND

Fraudulent web traffic has become an increasing problem in the area of online advertising. Illegitimate web traffic can occur in the form of fraudulent page views or fraudulent creative impressions. Both of these pose a problem in online advertising because a company could end up paying for impressions of web content that are not viewed by human users. By some estimates, this illegitimate online traffic means some creative providers waste as much as 25 to 50 percent of money spent on advertising.

There are many methods known in the art for fraudulent traffic detection and estimation. Many of these methods are binary matching mechanisms that look at the signatures of incoming signals. An example of a binary matching mechanism is a firewall. If a signal matches a given set of blacklisted signatures, the firewall will block the signal. However, binary matching mechanisms have to check each incoming signal in order to determine whether the signal corresponds to non-human traffic or low quality traffic, which can become burdensome. In some implementations, it may be preferable to establish baseline traffic behavior for a particular webpage or creative. Fraudulent traffic can be detected based on whether traffic for the webpage or creative changes significantly from the baseline behavior.

Accordingly, there is a need for improved methods and systems for fraudulent traffic detection and estimation.

SUMMARY OF THE DISCLOSURE

The foregoing needs are met, to a great extent, by the computer-implemented method for fraudulent traffic detection and estimation described below. Initially, an empirical distribution of a plurality of features based on a first plurality of datapoints for the plurality of features is received. The first plurality of datapoints is related to a plurality of web traffic. A model distribution of the plurality of features based on a second plurality of datapoints for the plurality of features is also received. The second plurality of datapoints is related to a plurality of reliable web traffic. Then, a minimum number of datapoints to remove from the first plurality of datapoints to create a modified empirical distribution corresponding to the model distribution within a first significance level is determined. It is then determined that the minimum number of datapoints is greater than a first threshold. Finally, an alert that the first plurality of web traffic includes at least one fraudulent instance of web traffic is generated in response to the determination that the minimum number of datapoints is greater than the first threshold.

In some aspects, receiving the empirical distribution of the plurality of features from the first plurality of datapoints for the plurality of features includes receiving the first plurality of datapoints for the plurality of features and generating the empirical distribution of the plurality of features based on the first plurality of datapoints.

In some aspects, receiving the empirical distribution of the plurality of features based on the first plurality of datapoints for the plurality of features includes selecting the plurality of features based on properties of events that generate the first plurality of web traffic. In further aspects, the properties of events that generate the first plurality of web traffic include at least one of a type of operating system, an internet browser, a web domain of a creative, a geographic location, and an IP address.

In some aspects, receiving the model distribution of the plurality of features based on the second plurality of datapoints for the plurality of features includes receiving the first plurality of datapoints for the plurality of features and generating the empirical distribution of the plurality of features based on the first plurality of datapoints.

In some aspects, receiving the model distribution of the plurality of features based on the second plurality of datapoints for the plurality of features includes receiving, from at least one approved domain, the model distribution of the plurality of features based on the second plurality of datapoints related to the plurality of reliable web traffic.

In some aspects, the features include at least one of a type of operating system, an internet browser, a web domain of a creative, and an IP address. In some aspects, the alert is a message including metadata of the at least one fraudulent instance of web traffic.

In some aspects, determining the minimum of datapoints to remove from the first plurality of datapoints to create the modified empirical distribution corresponding to the model distribution within the first significance level includes removing a first number of first datapoints from the first plurality of datapoints to generate a first distribution. It may also include removing the first number of second datapoints from the first plurality of datapoints to generate a second distribution. The second datapoints may be different from the first datapoints.

In further aspects, determining the minimum of datapoints to remove from the first plurality of datapoints to create the modified empirical distribution corresponding to the model distribution within the first significance level includes determining a first divergence between the first distribution and the model distribution. It may also include determining a second divergence between the second distribution and the model distribution. It may also include comparing the first divergence with the second divergence. Finally, it may include determining, in response to the comparison of the first divergence with the second divergence, that the first divergence is a first minimum divergence among the first divergence and the second divergence.

In further aspects, determining the minimum of datapoints to remove from the first plurality of datapoints to create the modified empirical distribution corresponding to the model distribution within the first significance level includes determining that the first minimum divergence is greater than a first confidence level. It may also include determining, in response to the determination that the first minimum divergence is greater than the first confidence level, that the first distribution does not correspond to the model distribution within the first significance level.

In further aspects, determining the minimum of datapoints to remove from the first plurality of datapoints to create the modified empirical distribution corresponding to the model distribution within the first significance level includes removing a second number of third datapoints from the first plurality of datapoints to generate a third distribution. It may also include removing the second number of fourth datapoints from the first plurality of datapoints to generate a fourth distribution. The fourth datapoints may be different from the third datapoints.

In further aspects, determining the minimum of datapoints to remove from the first plurality of datapoints to create the modified empirical distribution corresponding to the model distribution within the first significance level includes determining a third divergence between the third distribution and the model distribution. Next, it may also include determining a fourth divergence between the fourth distribution and the model distribution. Then, it may also include comparing the third divergence with the fourth divergence. Finally, it may include determining, in response to the comparison of the third divergence with the fourth divergence, that the third divergence is a second minimum divergence among the third divergence and the fourth divergence.

In further aspects, determining the minimum of datapoints to remove from the first plurality of datapoints to create the modified empirical distribution corresponding to the model distribution within the first significance level includes determining that the second minimum divergence is less than the a second confidence level. It may also include determining, in response to the determination that the second minimum divergence is less than the second confidence level, that the third distribution corresponds to the model distribution within the first confidence level.

In some aspects, the first divergence is calculated according to the following equation:

$$\sum_i P(i) \ln \frac{P(i)}{Q(i)},$$

where P is the first distribution and Q is the model distribution.

In some aspects, the first confidence level is calculated according to the following equation:

$$\frac{1}{p}\log\left(\frac{1}{e}\right) + \frac{2n}{p}\log(p+1),$$

where n is an amount of the plurality of features, p is an amount of the first plurality of datapoints, and e is a significance level.

In some aspects, receiving the model distribution of the plurality of features based on the second plurality of datapoints for the plurality of features includes periodically updating the model distribution of the plurality of features at predetermined time intervals.

In some aspects, determining that the minimum number of datapoints is greater than the first threshold includes setting the first threshold based on properties of events that generate the first plurality of web traffic.

A system for fraudulent traffic detection and estimation, where the system includes at least one processor connected to at least one storage device is also disclosed according to some aspects. An article of manufacture including non-transitory machine-readable media having instructions encoded thereon is also disclosed according to some aspects.

Certain aspects of fraudulent traffic detection and estimation have been outlined such that the detailed description thereof herein may be better understood and in order for the present contribution to the art may be better appreciated. There are, of course, additional aspects of the disclosure that will be described below and which will form the subject matter of the claims appended hereto.

In this respect, before explaining at least one aspect of fraudulent traffic detection and estimation in detail, it is to be understood that the fraudulent traffic detection and estimation is not limited in its application to the specific steps or details set forth in the following description or illustrated in the drawings. Rather, other aspects in addition to those described can be practiced and carried out in various ways. Also, it is to be understood that the phraseology and terminology employed herein, as well as the Abstract, are for the purpose of description and should not be regarded as limiting.

As such, those skilled in the art will appreciate that the conception upon which this disclosure is based may readily be utilized as a basis for the designing other structures, methods, and systems for carrying out the several purposes of fraudulent traffic detection and estimation. It is important, therefore, that the claims be regarded as including such equivalent constructions insofar as they do not depart from the spirit and scope of the disclosure.

BRIEF DESCRIPTION OF THE DRAWINGS

In order that the disclosure may be readily understood, aspects of this disclosure are illustrated by way of examples in the accompanying drawings.

The same reference numbers are used in the drawings and the following detailed description to refer to the same or similar parts.

DETAILED DESCRIPTION

Figure 1:
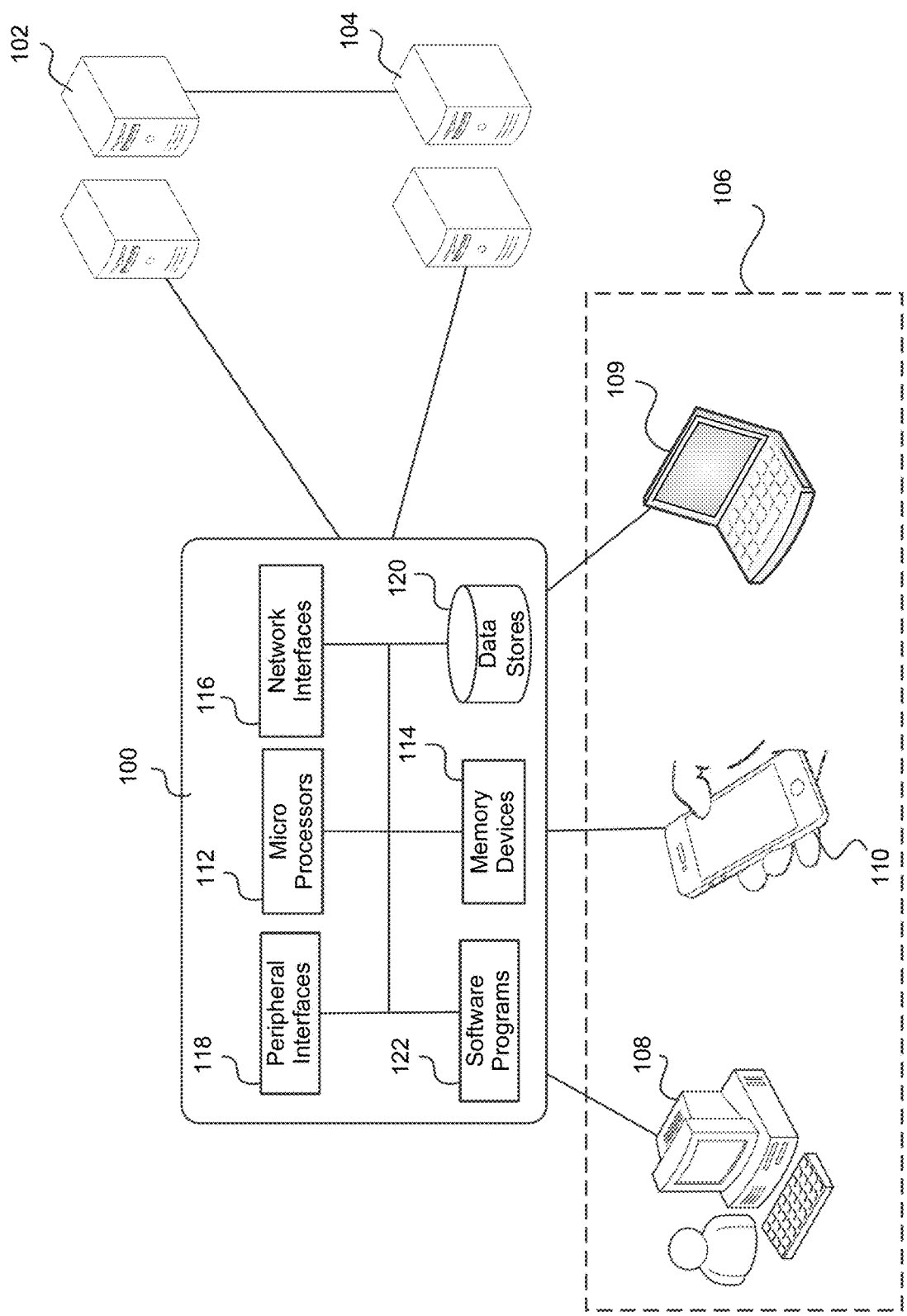
FIG. 1 illustrates an exemplary hardware and network configurations for a content provider, a creative provider, an analysis network, and client devices.

FIG. 1 illustrates exemplary hardware and network configurations for various devices that may be used to perform one or more operations of the described aspects. As shown, a content provider 100, a creative provider 102, and an analysis network 104 are in communication with one another. A content provider 100 may be a website owner or content publisher. The creative provider 102 may be a company seeking to market or sell products or services, or an advertisement agency or broker that may provide advertisements (i.e. creatives) to a content provider 100. The analysis network 104 may be a third-party seeking to receive information related to the advertisements received by the content provider 100 and assist the creative provider 102 in the delivery of a creative.

The content provider 100 may be in communication with a plurality of client devices 106. A client device 106 may be anyone who is viewing a webpage or other web or application content of the content provider 100. As further described below, the client devices 106 may be the devices that receive an advertisement. The client devices 106 may include a personal computing device, such as a desktop 108, a laptop computer 109, a mobile device 110, such as a smartphone or tablet, a kiosk terminal, a Global Positioning System (GPS) device, or another device. The client device 106 may receive client-side code to render a webpage from one or more external devices, such as a web server involved with serving webpages, advertisements, creative, or other information to the client device 106.

Although only the hardware configurations for the content provider 100 are shown in FIG. 1, each of the content provider 100, the creative provider 102, the analysis network 104, and the client devices 106, may include microprocessors 112 of varying core configurations and clock frequencies. These entities may also include one or more memory devices or computer-readable media 114 of varying physical dimensions and storage capacities, such as flash drives, hard drives, random access memory, etc., for storing data, such as images, files, and program instructions for execution by one or more microprocessors 112. These entities may include one or more network interfaces 116, such as Ethernet adapters, wireless transceivers, or serial network components for communicating over wired or wireless media using protocols, such as Ethernet, wireless Ethernet, code divisional multiple access (CDMA), time division multiple access (TDMA), etc. These communication protocols may be used to communicate between the content provider 100, the creative provider 102, the analysis network 104, and the client devices 106. These entities may also have one or more peripheral interfaces 118, such as keyboards, mice, touchpads, computer screens, touchscreens, etc. for enabling human interaction with and manipulation of devices of the content provider 100, the creative provider 102, the analysis network 104, and the client devices 106.

The content provider 100, the creative provider 102, the analysis network 104, and the client devices 106 may each have the computer-readable media 114 physically or logically arranged or configured to provide for or store one or more data stores 120, such as one or more file systems or databases, and one or more software programs 122, which may contain interpretable or executable instructions for performing one or more of the disclosed aspects. The components may comprise any type of hardware, including any necessary firmware or software for performing the disclosed aspects. The components may also be implemented in part or in whole by electronic circuit components or processors, such as application-specific integrated circuits (ASIC) or field-programmable gate arrays (FPGAs).

Figure 2:
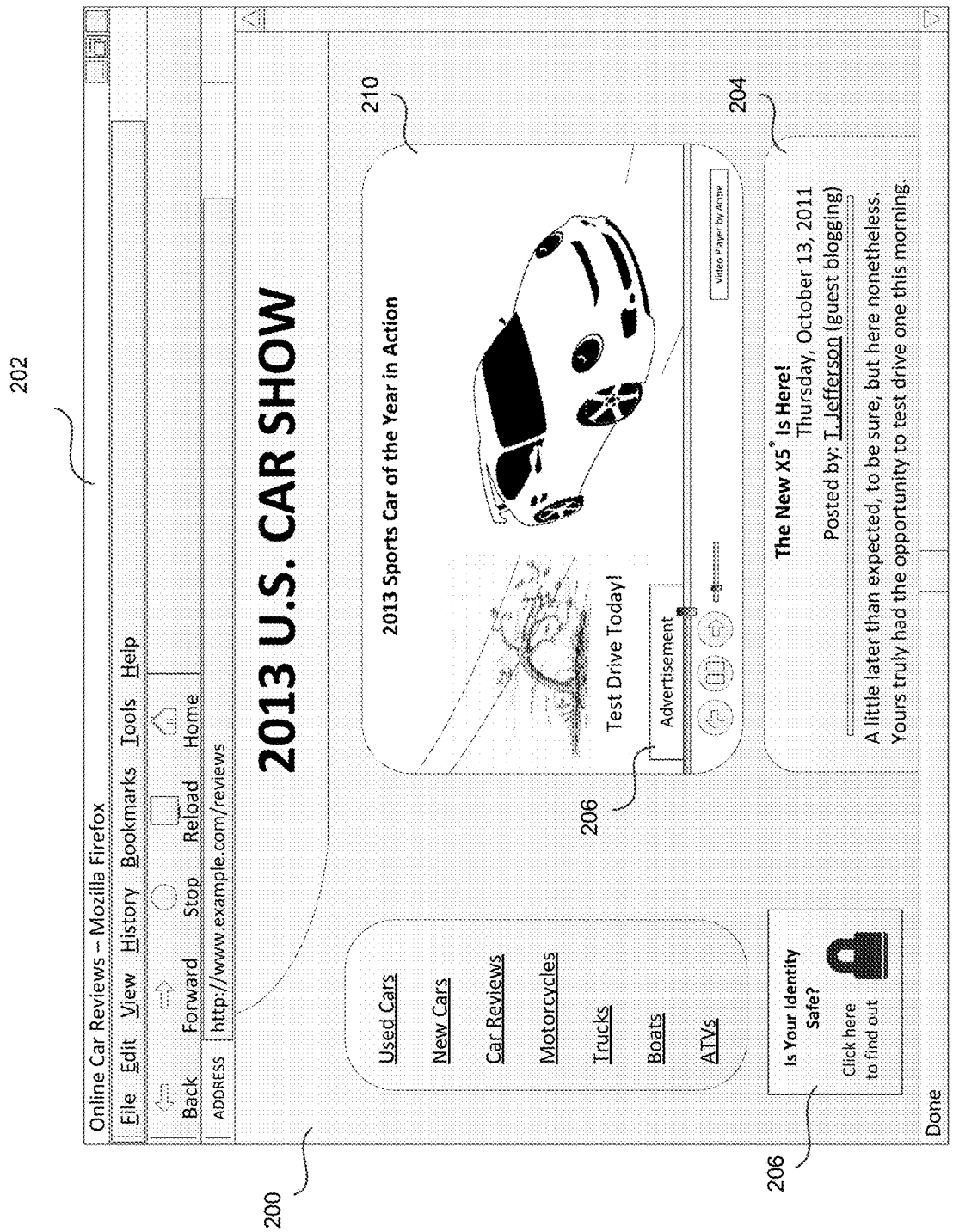
FIG. 2 illustrates an exemplary webpage of a content provider.

FIG. 2 is a diagram depicting an exemplary webpage 200 of the content provider 100. The webpage 200 may be rendered by a web browser 202 on a client device 106 and displayed on a screen of the client device 106. The webpage 200 may include content 204 and at least one creative 206. The creative 206 may be a static advertisement, an animated advertisement, a dynamic advertisement, a video advertisement, a public service announcement, or another form of information to be displayed on a screen of the client device 106.

In order to render the creative 206, the markup language of the webpage 200 may include a creative tag associated with the desired creative 206. For example, if the webpage 200 is coded with HyperText Markup Language (HTML), the creative tag may be an HTML tag or JavaScript tag that links to the creative 206. The creative tag may direct the client device 106 to retrieve the creative 206 from a creative provider 102. It will be appreciated that the creative tag may be a series of successive links that ultimately redirect to the creative 206. As used herein, the term creative link includes both a direct link to the creative 206 as well as a series of successive links to the creative 206, through, for example, one or more advertisement networks.

Further, the webpage 200 may have instructions for embedding a video player 210 as a part of the content to be displayed on the page. The video player 210 may be configured to play video content, such as video advertisements, to open executable files, such as Shockwave Flash files, or to execute other instructions. The video player 210 may be a separate component that is downloaded and executed by the web browser 202, such as an Adobe Flash, Apple QuickTime, or Microsoft Silverlight object; a component of the web browser 202 itself, such as a HTML 5.0 video player; or any other type of component able to render and play video content within the web browser 202. The video player may be configured to play featured video content in addition to a creative 206. The video player may also be configured to retrieve the creative 206 through a creative tag that links to the desired creative 206.

The content provider 100, the creative provider 102, the analysis network 104, or other party may track each time the webpage 200, a creative 206, or other web content is fetched from its source and/or delivered to a client device 106. In addition to simply counting the number of requests for the webpage 200 or the number of impressions of a creative 206, the content provider 100, the creative provider 102, the analysis network 104, or other party may track additional related information including an operating system of the client device 106, a web browser, an IP address of the client device 106, a MAC address of the client device 106, a domain of the creative 206, demographic information related to the client device 106, or any other information. The information gathered by the content provider 100, the creative provider 102, the analysis network 104, or other party may be used for a variety of purposes including fraudulent traffic detection and estimation.

Figure 3:
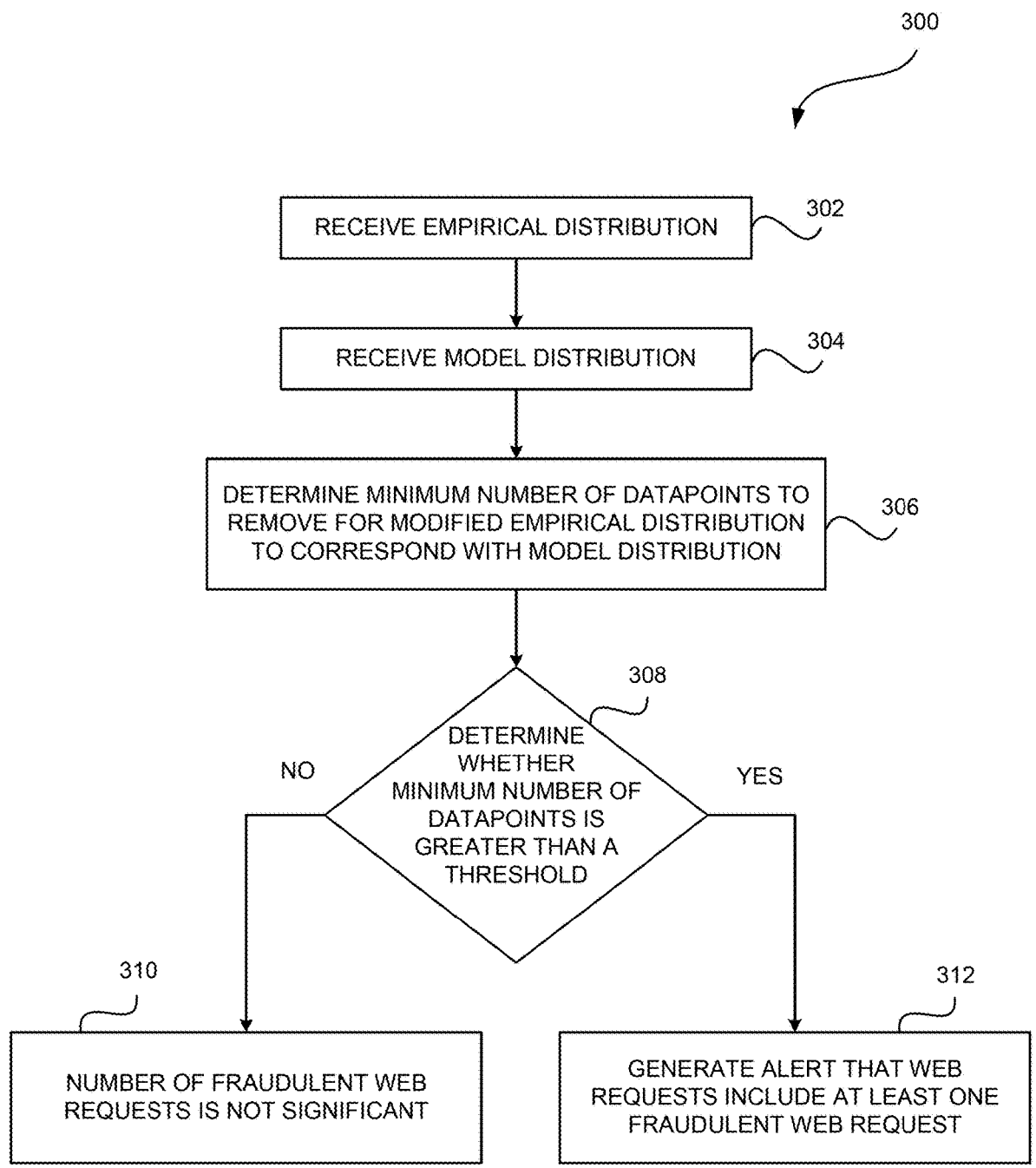
FIG. 3 illustrates an example of a process for fraudulent traffic detection and estimation.

FIG. 3 illustrates an example of a process 300 for fraudulent traffic detection and estimation. Initially at step 302, an empirical distribution of a plurality of datapoints for at least one feature is received. The process of receiving an empirical distribution is subsequently described in more detail with respect to FIG. 4. The empirical distribution may be distribution of a plurality of datapoints related to a plurality of web traffic. The term web traffic may refer to web requests or requests for web content, and may correspond to the page views of a particular web page, the impressions of a particular creative 206, a group of creatives 206, or an advertising campaign, or requests for other web content. In addition to traffic from traditional browsers, the term web traffic may also refer to data traffic from mobile device applications, such as requests for creatives 206 and/or other content from within a mobile device application instead of a web browser 202. The empirical distribution may also be a probability distribution, such as a probability density function, of the foregoing datapoints.

The features of the empirical distribution may be properties useful for fraudulent traffic detection, including the information mentioned above with respect to FIG. 2, such as an operating system of the client device 106, a web browser, an IP address of the client device 106, or other relevant information. The empirical distribution may be a discrete distribution or a continuous distribution of at least one of these features. For example, the empirical distribution may be a discrete distribution of operating systems used to make the web requests of a particular web page, creative 206, or other web content. In another example, the empirical distribution may be a continuous multivariate distribution of geographic and time of access information related to related to web traffic related to a particular web domain or for particular web content.

In step 304, the process 300 receives a model distribution of a plurality of datapoints for at least one feature. The process of receiving a model distribution is subsequently described in more detail with respect to FIG. 4. Similar to the empirical distribution, the model distribution may be a discrete distribution or a continuous distribution of at least one feature. The model distribution may be distribution of a plurality of datapoints received related to a plurality of reliable web traffic related to a web page a creative 206, or other web content. The datapoints related to reliable web traffic may correspond to web traffic related to a single web domain or multiple web domain from which the web traffic are believed to include no or limited instances of fraudulent traffic. The reliable web traffic may be used to establish baseline behavior for the process 300. As used herein, the term "model distribution" can refer to a plurality of model distributions that may be used for fraudulent traffic detection and estimation. Although step 304 is illustrated in FIG. 3 as occurring after step 302, in other aspects, step 302 may be performed simultaneously with or after step 304.

Figure 4:
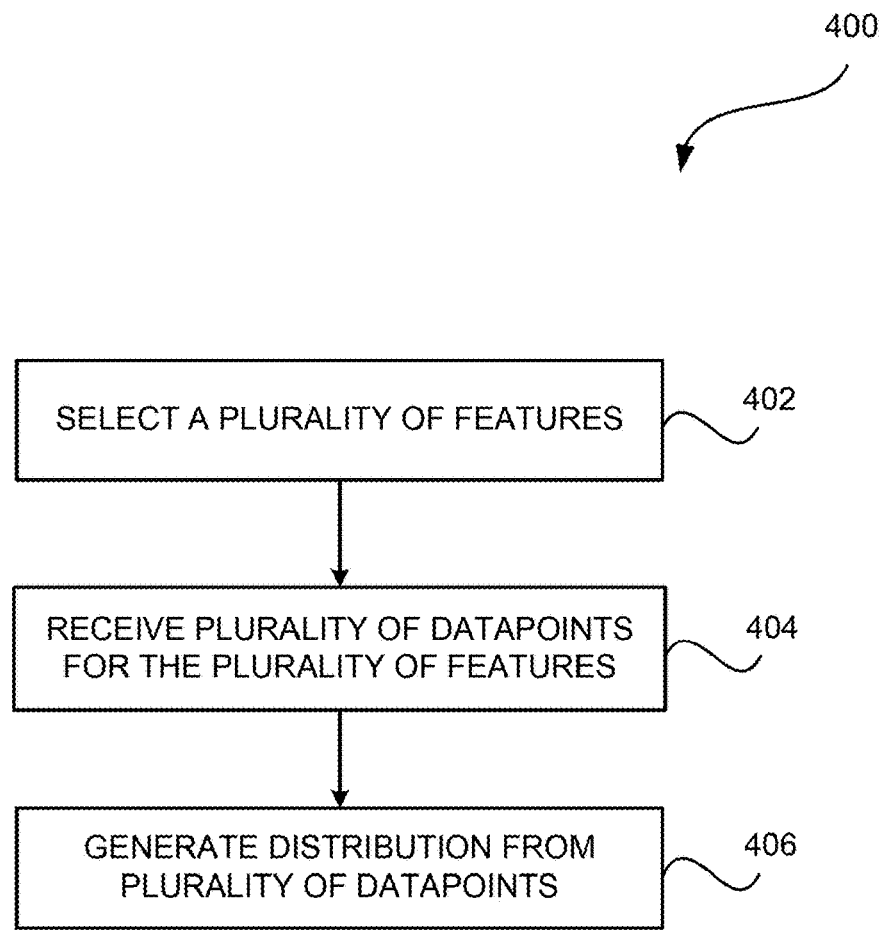
FIG. 4 illustrates an example of a process for receiving a distribution.

FIG. 4 illustrates an example of a process 400 for receiving a distribution. The process 400 may be implemented for receiving the empirical distribution or receiving the model distribution as described above. At step 402, the process 400 may select a plurality of features of which to receive datapoints. The process 400 may select the features based on properties of events that may generate the web traffic. Fraudulent traffic may originate from different sources, such as botnets, pay per view networks, cloud infrastructures, or other sources. Each of these sources may have particular properties that may be more probative to detect fraudulent traffic. For example, an IP address may be more helpful to detect fraud originating from a pay-per-view network, while web browser information may be more helpful to detect fraud originating from a botnet. The process 400 may select at least one feature based on the type of fraud the system seeks detect.

At step 404, the process 400 receives a plurality of datapoints for a plurality of features. The plurality of datapoints may be received in real-time or in a batch process. At step 406, the process 400 generates a distribution from the plurality of datapoints. The process 400 may generate the distribution through aggregating the data, statistical binning, fitting a probability mass function, fitting a probability density function, or another process depending on the features selected in step 402. The model distribution, the process 400 may update the model distribution at predetermined time intervals, such as every hour, every twenty-four hours, or every week.

Referring back to FIG. 3, the process 300 proceeds to step 306 after steps 302 and 304. In step 306, the process 300 determines a minimum number of datapoints to remove from the empirical distribution in order for the modified empirical distribution to correspond with the model distribution within a confidence level. The process of determining a minimum number of datapoints to remove is described subsequently in more detail with respect to FIG. 5. The minimum number of datapoints may correspond to the number of potentially fraudulent instances of web traffic.

At step 308, the process 300 determines whether the minimum number datapoints removed is greater than a threshold. The threshold may be an absolute number of datapoints, a rate of datapoints, or a fraction of total datapoints. For example, the process 300 may determine whether the minimum number of datapoints removed is greater than 10% of the total number of datapoints of the empirical distribution. In another example, the process 300 may determine whether minimum number of datapoints removed is greater than 10,000 datapoints over a 24-hour period. The value of the threshold may depend on the features of the empirical distribution and/or model distribution. The value of the threshold may also depend on time, such as depending on the time of day, the day of the week, the month, or other criteria. The value of the threshold may also depend on the traffic of the web content or the traffic of the web domain hosting the web content.

If the minimum number of datapoints is greater than the threshold, the process 300 proceeds to step 310. At step 310, the process 300 may generate an alert that the web traffic related to the plurality of datapoints of the empirical distribution include fraudulent web traffic. The alert may be forwarded to a content provider 100, a creative provider 102, or an analysis network 104 for further action. The alert may be a message containing metadata or other information related to the fraudulent instances of web traffic. The content provider 100, the creative provider 102, the analysis network 104, or another party may take appropriate action following receipt of the alert and/or message.

If the minimum number of datapoints is not greater than the threshold, the process 300 may proceed to step 312. At step 312, the process 300 determines that the number of potentially fraudulent instances of web traffic is not significant. In some aspects, the process 300 may not take further action. In other aspects, if the minimum number of datapoints was close to the threshold, the process 300 may indicate the web content, such as a particular web page or creative, corresponding to the plurality of datapoints of the empirical distribution requires additional attention and/or further analysis.

Figure 5:
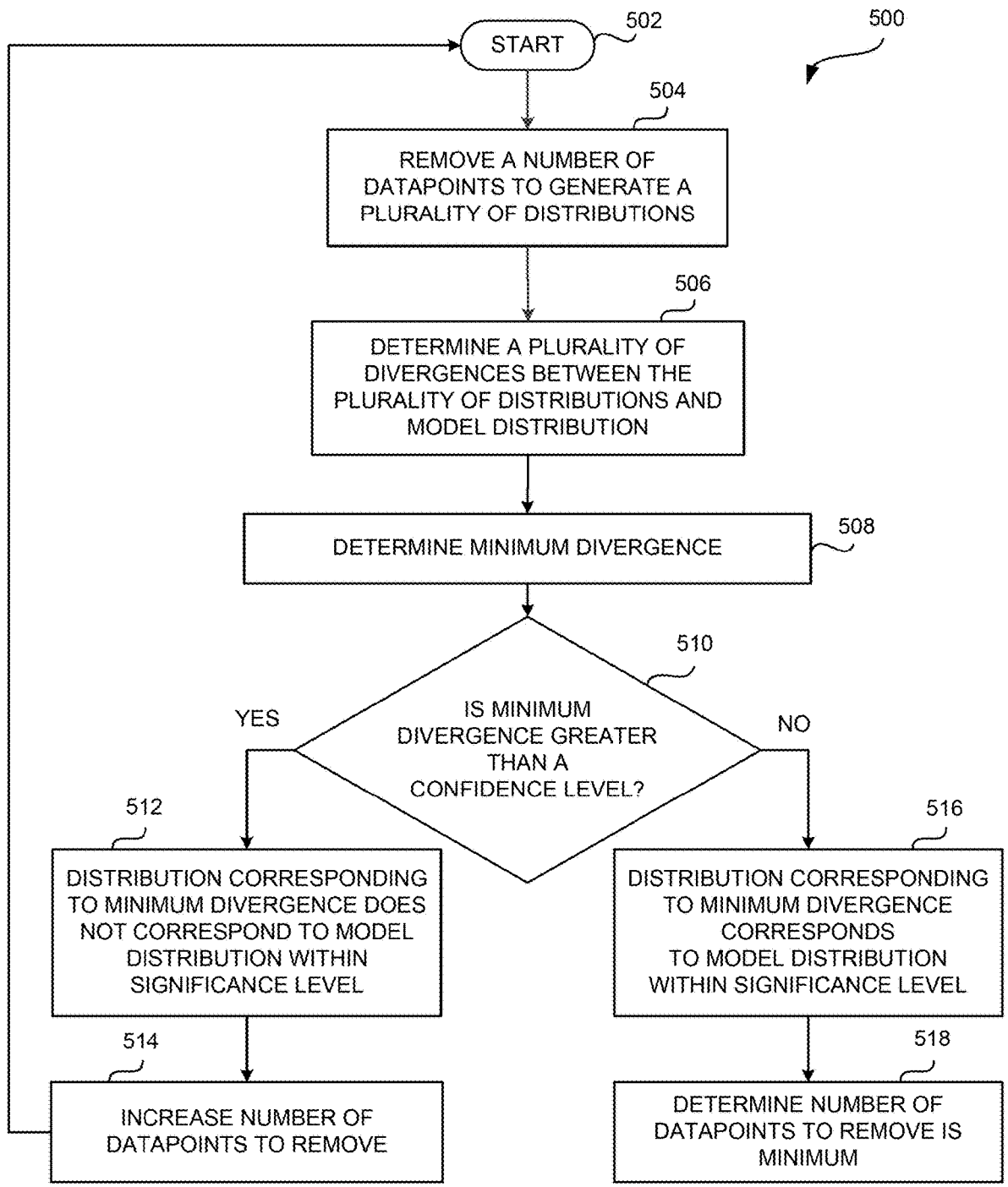
FIG. 5 illustrates an example of a process for determining a minimum number of datapoints to remove from a distribution.

FIG. 5 illustrates a process 500 for determining a minimum number of datapoints to remove from a distribution. The process 500 starts at step 502. At step 504, the process 500 removes a first number datapoints from the empirical distribution to generate a plurality of modified distributions. For example, the process 500 may remove the first number of datapoints to generate a first modified distribution. The process may remove the same first number of different datapoints from the empirical distribution to generate a second modified empirical distribution. Although the first number of datapoints to be removed may be the same, the datapoints themselves removed in are different. The plurality of modified empirical distributions may include the full set or a partial set of all possible modified empirical distributions that can be created by removing the first number of datapoints from the empirical distribution.

At step 506, the process 500 determines a plurality of divergences between the plurality of modified empirical distributions generated in step 504 and a model distribution, such as the model distribution received in the process 300. If two modified empirical distributions were generated in step 504, for example, the process 500 would determine two different divergences between the first modified distribution and the model distribution and between the second modified distribution and the model distribution. Each divergence may be a measure of the difference between the modified empirical distribution and the model distribution. The divergence may be a statistical distance between the modified empirical distribution and the model distribution, such as a squared Hellinger distance, a Jeffrey's divergence, a Kullback-Leibler divergence, a Kagan's divergence, or another statistical divergence known in the art. For example, the divergence may be calculated by the following Equation 1:

$$\sum_i P(i) \ln \frac{P(i)}{Q(i)}, \qquad (1)$$

where P is the first distribution and Q is the model distribution.

At step 508, the process 500 may compare the plurality of divergences determined in step 506. The process 500 then determines a minimum divergence between the plurality of divergences. The minimum divergence may be the divergence with the lowest value as calculated by Equation 1 above.

At step 510, the process 500 may determine whether the minimum divergence is greater than a confidence level. The confidence level may represent a statistical measure that the modified empirical distribution with the minimum divergence corresponds to the model distribution within a particular significance level. The confidence level may be different depending on the type of statistical distribution calculated in steps 508 and 510. For example, for Equation 1 above, it can be shown that the confidence level can be calculated according to the following Equation 2:

$$\frac{1}{p} \log\left(\frac{1}{e}\right) + \frac{2n}{p} \log(p+1), \qquad (2)$$

where n is an amount of the plurality of features, p is an amount of the datapoints, and e is a significance level. That is, the process 500 may determine whether the minimum divergence is greater than the value calculated by Equation 2.

If the minimum divergence is greater than the confidence level, at step 512, the process 500 determines that the modified empirical distribution with the minimum divergence does not correspond to the model distribution within a desired significance level. Because the minimum divergence does not correspond, the modified empirical distribution still contains contamination from potentially fraudulent instances of web traffic.

At step 514, then, the process 500 increases the number of datapoints to be removed from the empirical distribution to generate a second plurality of modified empirical distributions. The process 500 may increase the number of datapoints to be removed in fixed increments. In other aspects, the process 500 may increase the number of datapoints to be removed based on the minimum divergence, confidence level, and/or significance level. The process 500 then returns to step 502 and proceeds to step 504 to generate new modified empirical distributions by removing additional datapoints.

If the minimum divergence is less than the confidence level, at step 516, it is determined that the modified empirical distribution with the minimum divergence corresponds to the model distribution within a desired significance level. At step 518 it is determined that the first number of datapoints removed from the empirical distribution to generate the modified empirical distribution is the minimum number of datapoints that need to be removed for the modified empirical distribution to correspond to the model distribution within a desired significance level.

The processes of FIGS. 3, 4, and 5 may be implemented at the content provider 100, the creative provider 102, the analysis network 104, at one or more client device 106, or another party. Although the processes of FIGS. 3, 4, and 5 have been described with respect to fraudulent traffic detection and estimation, certain aspects of FIGS. 3, 4, and 5 may be implemented for other types of anomaly and/or contamination detection in other datasets.

Certain aspects of the process of FIGS. 3, 4, and 5 may be implemented as or using a computer program or set of programs. The computer programs may exist in a variety of forms both active and inactive. For example, the computer programs may exist as software program(s) comprised of program instructions in source code, object code, scripts, executable code or other formats, firmware programs(s), or hardware description language (HDL) files. Any of the above may be embodied on a non-transitory computer readable medium, which include storage devices, in compressed or uncompressed form. Exemplary computer readable storage devices may include conventional computer system random access memory (RAM), read-only memory (ROM), erasable, programmable memory (EPROM), electrically erasable, programmable memory (EEPROM), and magnetic or optical disks or tapes.

Certain aspects of the process of FIGS. 3, 4, and 5 may utilize or include a computer system, which may include one or more processors coupled to random access memory operating under control of or in conjunction with an operating system. The processors may be included in one or more servers, clusters, or other computers or hardware resources, or may be implemented using cloud-based resources. The processors may communicate with persistent memory, which may include a hard drive or disk array, to access or store program instructions or other data. The processors may be programmed or configured to execute computer-implemented instructions to perform the steps disclosed herein.

While the fraudulent traffic detection and estimation method has been described in terms of what may be considered to be specific aspects, this disclosure need not be limited to the disclosed aspects. Additional modifications and improvements may be apparent to those skilled in the art. As such, this disclosure is intended to cover various modifications and similar arrangements included within the spirit and scope of the claims, the scope of which should be accorded the broadest interpretation so as to encompass all such modifications and similar methods. The present disclosure should be considered as illustrative and not restrictive.

The invention claimed is:

1. A computer-implemented method for fraudulent traffic detection and estimation, the computer-implemented method comprising:
   receiving, for each of a plurality of different types of web traffic features, an empirical distribution of a first plurality of datapoints, wherein the first pluralities of datapoints are related to a first plurality of web traffic;
   receiving, for each of the plurality of different types of web traffic features, a model distribution of a second plurality of datapoints, wherein the second pluralities of datapoints are related to a plurality of reliable web traffic;

determining a minimum amount of datapoints to remove from each of the first pluralities of datapoints to create modified empirical distributions each corresponding to the model distribution within a first confidence level, wherein determining the minimum amount of datapoints to remove from each of the first pluralities of datapoints to create the modified empirical distributions comprises:
- removing a first amount of first datapoints from each of the first pluralities of datapoints to generate first distributions,
- removing a first amount of second datapoints from each of the first pluralities of datapoints to generate second distributions, the second datapoints being different from the first datapoints,
- determining a first divergence between each of the first distributions and the model distribution,
- determining a second divergence between each of the second distributions and the model distribution,
- comparing the first divergence with the second divergence,
- determining, in response to the comparison of the first divergence with the second divergence, that the first divergence is a first minimum divergence,
- determining that the first minimum divergence is greater than the first confidence level, and
- determining, in response to the determination that the first minimum divergence is greater than the first confidence level, that the first distribution does not correspond to the model distribution within the first confidence level; and determining that at least one of the removed minimum amount of datapoints is greater than a first threshold, wherein the first threshold comprises at least one of an absolute number of datapoints, a rate of datapoints, or a fraction of total datapoints; and generating an alert that the first plurality of web traffic includes at least one fraudulent instance of web traffic in response to the determination that the at least one of the removed minimum amount of datapoints is greater than the first threshold.

2. The computer-implemented method of claim 1, wherein receiving the empirical distributions comprises:
- receiving the first plurality of datapoints for each of the plurality of different types of web traffic features; and
- generating the empirical distribution of the plurality of different types of web traffic features based on the first pluralities of datapoints.

3. The computer-implemented method of claim 1, wherein receiving the empirical distributions comprises selecting the plurality of different types of web traffic features based on properties of events that generate the first plurality of web traffic.

4. The computer-implemented method of claim 3, wherein the properties of events that generate the first plurality of web traffic include at least two of a type of operating system, an internet browser, a web domain of a creative, and a geographic location.

5. The computer-implemented method of claim 1, wherein receiving the model distributions comprises:
- receiving the second plurality of datapoints for each of the plurality of different types of web traffic features; and
- generating the empirical distribution of the plurality of different types of web traffic features based on the second pluralities of datapoints.

6. The computer-implemented method of claim 1, wherein receiving the model distributions comprises receiving, from at least one approved domain, the model distribution of the plurality of different types of web traffic features based on the second pluralities of datapoints related to the plurality of reliable web traffic.

7. The computer-implemented method of claim 1, wherein the different types of web traffic features include at least two of a type of operating system, an internet browser, and a web domain of a creative.

8. The computer-implemented method of claim 1, wherein the alert is a message including metadata of the at least one fraudulent instance of web traffic.

9. The computer-implemented method of claim 1, wherein each of the first divergences is calculated according to the following equation:

$$\sum_i P(i)\ln\frac{P(i)}{Q(i)},$$

where:
P is the first distribution, and
Q is the model distribution.

10. The computer-implemented method of claim 1, wherein the first confidence level is calculated according to the following equation:

$$\frac{1}{p}\log\left(\frac{1}{e}\right) + \frac{2n}{p}\log(p+1),$$

where:
n is an amount of the plurality of different types of web traffic features,
p is an amount of the first plurality of datapoints for each of the plurality of different types of web traffic features, and
e is a confidence level.

11. The computer-implemented method of claim 1, wherein receiving the model distributions comprises periodically updating each of the model distributions at predetermined time intervals.

12. The computer-implemented method of claim 1, wherein determining that at least one of the removed minimum amount of datapoints is greater than the first threshold comprises setting the first threshold based on properties of events that generate the first plurality of web traffic.

13. A system for fraudulent traffic detection and estimation, the system comprising at least one processor connected to at least one storage device, the system being configured to:
- receive, for each of a plurality of different types of web traffic features, an empirical distribution of a first plurality of datapoints, wherein the first pluralities of datapoints are related to a first plurality of web traffic;
- receive, for each of the plurality of different types of web traffic features, a model distribution of a second plurality of datapoints, wherein the second pluralities of datapoints are related to a plurality of reliable web traffic;
- determine a minimum amount of datapoints to remove from each of the first pluralities of datapoints to create modified empirical distributions each corresponding to the model distribution within a first confidence level, wherein the system is configured to determine the minimum amount of datapoints to remove from each of the first pluralities of datapoints to create the modified empirical distributions by:
removing a first amount of first datapoints from each of the first pluralities of datapoints to generate first distributions,
removing a first amount of second datapoints from each of the first pluralities of datapoints to generate second distributions, the second datapoints being different from the first datapoints,
determining a first divergence between each of the first distributions and the model distribution,
determining a second divergence between each of the second distributions and the model distribution,
comparing the first divergence with the second divergence,
determining, in response to the comparison of the first divergence with the second divergence, that the first divergence is a first minimum divergence,
determining that the first minimum divergence is greater than the first confidence level, and
determining, in response to the determination that the first minimum divergence is greater than the first confidence level, that the first distribution does not correspond to the model distribution within the first confidence level; and
determine that at least one of the removed minimum amount of datapoints is greater than a first threshold, wherein the first threshold comprises at least one of an absolute number of datapoints, a rate of datapoints, or a fraction of total datapoints; and
generate an alert that the first plurality of web traffic includes at least one fraudulent instance of web traffic in response to the determination that the at least one of the removed minimum amount of datapoints is greater than the first threshold.

14. A non-transitory machine-readable medium having instructions encoded thereon for causing a processor to:
receive, for each of a plurality of different types of web traffic features, an empirical distribution of a first plurality of datapoints, wherein the first pluralities of datapoints are related to a first plurality of web traffic;
receive, for each of the plurality of different types of web traffic features, a model distribution of a second plurality of datapoints, wherein the second pluralities of datapoints are related to a plurality of reliable web traffic;
determine a minimum amount of datapoints to remove from each of the first pluralities of datapoints to create modified empirical distributions each corresponding to the model distribution within a first confidence level, wherein the processor is caused to determine the minimum amount of datapoints to remove from each of the first pluralities of datapoints to create the modified empirical distributions by:
removing a first amount of first datapoints from each of the first pluralities of datapoints to generate first distributions,
removing a first amount of second datapoints from each of the first pluralities of datapoints to generate second distributions, the second datapoints being different from the first datapoints,
determining a first divergence between each of the first distributions and the model distribution,
determining a second divergence between each of the second distributions and the model distribution,
comparing the first divergence with the second divergence,
determining, in response to the comparison of the first divergence with the second divergence, that the first divergence is a first minimum divergence,
determining that the first minimum divergence is greater than the first confidence level, and
determining, in response to the determination that the first minimum divergence is greater than the first confidence level, that the first distribution does not correspond to the model distribution within the first confidence level; and
determine that at least one of the removed minimum amount of datapoints is greater than a first threshold, wherein the first threshold comprises at least one of an absolute number of datapoints, a rate of datapoints, or a fraction of total datapoints; and
generate an alert that the first plurality of web traffic includes at least one fraudulent instance of web traffic in response to the determination that the at least one of the removed minimum amount of datapoints is greater than the first threshold.

15. The system of claim 13, wherein the system is configured to receive the empirical distributions by:
receiving the first plurality of datapoints for each of the plurality of different types of web traffic features; and
generating the empirical distribution of the plurality of different types of web traffic features based on the first pluralities of datapoints.

16. The system of claim 13, wherein the system is configured to receive the model distributions by:
receiving the second plurality of datapoints for each of the plurality of different types of web traffic features; and
generating the empirical distribution of the plurality of different types of web traffic features based on the second pluralities of datapoints.

17. The system of claim 13, wherein the different types of web traffic features include at least two of a type of operating system, an internet browser, and a web domain of a creative.

18. The medium of claim 14, wherein the processor is caused to receive the empirical distributions by:
receiving the first plurality of datapoints for each of the plurality of different types of web traffic features; and
generating the empirical distribution of the plurality of different types of web traffic features based on the first pluralities of datapoints.

19. The medium of claim 14, wherein the processor is caused to receive the model distributions by:
receiving the second plurality of datapoints for each of the plurality of different types of web traffic features; and
generating the empirical distribution of the plurality of different types of web traffic features based on the second pluralities of datapoints.

20. The medium of claim 14, wherein the different types of web traffic features include at least two of a type of operating system, an internet browser, and a web domain of a creative.

* * * * *